United States Patent
Zhao et al.

(10) Patent No.: US 12,527,626 B2
(45) Date of Patent: Jan. 20, 2026

(54) TUNNEL POSITION DETERMINATION SYSTEM AND METHOD FOR ANTERIORPOSTERIOR CRUCIATE LIGAMENT RECONSTRUCTION

(71) Applicant: SHANGHAI DROIDMEDS MEDICAL CO., LTD., Shanghai (CN)

(72) Inventors: Jinzhong Zhao, Shanghai (CN); Shaobai Wang, Shanghai (CN); Yao Hou, Shanghai (CN); Jia Jiang, Shanghai (CN); Zhiqi Bian, Shanghai (CN); Wujian Zhou, Shanghai (CN); Hui Shen, Shanghai (CN)

(73) Assignee: SHANGHAI DROIDMEDS MEDICAL CO., LTD., Shanghai (CN)

( * ) Notice: Subject to any disclaimer, the term of this patent is extended or adjusted under 35 U.S.C. 154(b) by 362 days.

(21) Appl. No.: 18/024,087

(22) PCT Filed: Sep. 1, 2021

(86) PCT No.: PCT/CN2021/115864
§ 371 (c)(1),
(2) Date: Mar. 1, 2023

(87) PCT Pub. No.: WO2022/048553
PCT Pub. Date: Mar. 10, 2022

(65) Prior Publication Data
US 2023/0329792 A1    Oct. 19, 2023

(30) Foreign Application Priority Data

Sep. 2, 2020  (CN) .......................... 202010912346.4

(51) Int. Cl.
*A61B 34/10*    (2016.01)
*A61B 17/00*    (2006.01)
(Continued)

(52) U.S. Cl.
CPC ........ *A61B 34/10* (2016.02); *A61B 17/00234* (2013.01); *A61B 34/70* (2016.02);
(Continued)

(58) Field of Classification Search
CPC ......... A61B 34/10; A61B 34/00; A61B 34/70; A61B 17/00; A61B 17/00234; A61B 90/36; A61B 90/361; A61B 90/39
See application file for complete search history.

(56) References Cited

U.S. PATENT DOCUMENTS

2009/0216236 A1    8/2009  Re
2021/0322148 A1*  10/2021  Mitra ..................... G16H 50/20

FOREIGN PATENT DOCUMENTS

CN    102940530 A    2/2013
CN    105105849 A    12/2015
(Continued)

OTHER PUBLICATIONS

Anatomical Study on the Different Ways of Femoral Tunnel Orientation in ACL Reconstruction, by Qu. Cong et al.
(Continued)

*Primary Examiner* — Christopher J Beccia
(74) *Attorney, Agent, or Firm* — Bayramoglu Law Offices LLC

(57) ABSTRACT

Provided are a tunnel position determination system and method for anterior/posterior cruciate ligament reconstruction, which relate to the technical field of ligament reconstruction. The system includes: a coordinate system establishment module for establishing a femoral coordinate system and a tibial coordinate system; a feature point selection module for selecting femoral feature points and tibial feature points; and a tunnel position determination module for determining a femoral point and a tibial point during reconstruction on the basis of the femoral feature
(Continued)

points and the tibial feature points, and determining a specific tunnel position of an anterior or posterior cruciate ligament reconstruction tunnel by means of the femoral point and the tibial point. The present disclosure provides a method for selecting the femoral point and the tibial point during tunnel reconstruction, such that a specific path of a formed reconstruction tunnel is more accurate.

19 Claims, 7 Drawing Sheets

(51) Int. Cl.
    *A61B 34/00*         (2016.01)
    *A61B 90/00*         (2016.01)
(52) U.S. Cl.
    CPC ............ *A61B 90/361* (2016.02); *A61B 90/39* (2016.02); *A61B 2034/102* (2016.02); *A61B 2090/3937* (2016.02)

(56) References Cited

FOREIGN PATENT DOCUMENTS

| CN | 209490134 U | 10/2019 |
|---|---|---|
| CN | 110464458 A | 11/2019 |
| CN | 111887908 A | 11/2020 |
| CN | 212630809 U | 3/2021 |
| EP | 0440991 A1 | 8/1991 |

OTHER PUBLICATIONS

International Search Report, issued in PCT/CN2021/115864, dated Dec. 8, 2021.
Written Opinion, issued in PCT/CN2021/115864, dated Dec. 8, 2021.

\* cited by examiner

TUNNEL POSITION DETERMINATION SYSTEM AND METHOD FOR ANTERIORPOSTERIOR CRUCIATE LIGAMENT RECONSTRUCTION

BACKGROUND OF THE INVENTION

Field of the Invention

The present disclosure relates to the technical field of anterior and/or posterior cruciate ligament reconstruction, and particularly relates to a tunnel position determination system and method for anterior and/or posterior cruciate ligament reconstruction.

Description of the Prior Art

Ligament injury to a knee, one of the most complex joints of human body, is a common disease in sport medicine. In order to prevent knee instability from further degenerating into osteoarthritis or other adverse consequences, it is necessary to reconstruct a ruptured ligament in time. Knee ligament reconstruction generally involves diagnostic arthroscopy, cutting and preparation of a ligament graft, establishment of a bone tunnel with a ligament anatomical attachment point as an entrance and exit, implantation and fixation of the graft, among which the establishment of the bone tunnel for fixing a reconstructed ligament is vital and difficult during the surgery.

In the prior art, during establishment of the bone tunnel, selection of points on femur and tibia generally relies on the experience of the doctor, which is time-consuming and labor-consuming, and the surgery is likely to fail due to inexperience.

SUMMARY OF THE INVENTION

In order to solve the above problems, an objective of the present disclosure is to provide a tunnel position determination system and method for anterior/posterior cruciate ligament reconstruction, which provides a standard method for selecting the femoral point and the tibial point during tunnel reconstruction. Through the method in the present disclosure, a specific path of a formed reconstruction tunnel may be more accurate, and a success rate of surgery is increased.

The above objective of the present disclosure is realized through technical solutions as follows:

A tunnel position determination system for anterior/posterior cruciate ligament reconstruction includes:
  a point collecting and modeling device for determining a specific tunnel position of a reconstruction tunnel and specifically including:
  a coordinate system establishment module for establishing two coordinate systems including a femoral coordinate system based on a femur and a tibial coordinate system based on a tibia;
  a feature point selection module for selecting femoral feature points and tibial feature points by means of a probe under an arthroscope; where it should be noted that during anterior cruciate ligament reconstruction, the tibial feature points include a medial intercondylar crest lateral slope surface, a lateral meniscus anterior horn free edge, a transverse knee ligament midpoint, a lateral intercondylar crest top point, and a tibial plateau posterior cruciate ligament (PCL) anterior edge, and the femoral feature points include an over-the-top point and a lower reference point; and during posterior cruciate ligament reconstruction, the femoral feature points including a front reference point and a distal cartilage edge, and the tibial feature points including a joint capsule attachment point, a tibial PCL footprint half-area medial midpoint, and a tibial PCL footprint area lateral edge are selected by means of the probe in the case of photographing by the arthroscope; and
  a tunnel position determination module for determining a femoral point and a tibial point during reconstruction according to a preset reconstruction algorithm on the basis of the femoral feature points and the tibial feature points, and further determining the specific tunnel position of the anterior/posterior cruciate ligament reconstruction tunnel by means of the femoral point and the tibial point.

The tunnel position determination system for anterior/posterior cruciate ligament reconstruction further includes:
  a mechanical arm positioning device for being connected to the point collecting and modeling device to carry out physically assisted positioning on the reconstruction tunnel according to the determined specific tunnel position of the reconstruction tunnel, so as to guide anterior/posterior cruciate ligament surgery.

The tunnel position determination system for anterior/posterior cruciate ligament reconstruction further includes:
  an arthroscopy device for observing an inner structure of a joint to undergo surgery, and monitoring an anterior/posterior cruciate ligament reconstruction surgery process in real time, where the point collecting and modeling device is used for determining the specific tunnel position of the reconstruction tunnel according to the inner structure of the joint to undergo surgery.

A tunnel position determination method for anterior/posterior cruciate ligament reconstruction includes steps as follows:
  S1: establishing two coordinate systems including a femoral coordinate system based on a femur and a tibial coordinate system based on a tibia;
  S2: selecting femoral feature points and tibial feature points by means of a probe under an arthroscope; and
  S3: determining a femoral point and a tibial point during reconstruction according to a preset reconstruction algorithm on the basis of the femoral feature points and the tibial feature points, and further determining a specific tunnel position of an anterior/posterior cruciate ligament reconstruction tunnel by means of the femoral point and the tibial point.

Compared with the prior art, the present disclosure has at least one type of beneficial effects as follows:

(1) A tunnel position determination system for anterior/posterior cruciate ligament reconstruction is provided and includes: a point collecting and modeling device for determining a specific tunnel position of a reconstruction tunnel and specifically including: a coordinate system establishment module for establishing two coordinate systems, including a femoral coordinate system based on femur and a tibial coordinate system based on tibia; a feature point selection module for selecting femoral feature points and tibial feature points by means of a probe under an arthroscope; and a tunnel position determination module for determining a femoral point and a tibial point during reconstruction according to a preset reconstruction algorithm on the basis of the femoral feature points and the tibial feature points, and further determining the specific tunnel position of the posterior cruciate ligament reconstruction tunnel by means of the femoral point and the tibial point. According to the above technical solution, a standard method for selecting the femoral point and the tibial point during tunnel reconstruction is provided. By means of the system in the present disclosure, a specific path of a formed reconstruction tunnel is more accurate, and when a tunnel path reconstructed according to the present disclosure is used for surgery subsequently, a success rate of the surgery may be increased.

(2) The system in the present disclosure further includes a mechanical arm positioning device and an arthroscopy device besides the point collecting and modeling device. According to the above technical solution, by means of the arthroscopy device, an inner structure of a joint may be observed, and the whole process of surgery may be accurately observed; by means of the point collecting and modeling device, a position of a tunnel inside the joint is located, and a reconstruction tunnel is established to simulate a tunnel path; and by means of the mechanical arm positioning device, the tunnel path is subjected to physical positioning, so as to guide anterior/posterior cruciate ligament surgery.

BRIEF DESCRIPTION OF DRAWINGS

Various other advantages and benefits will become apparent to those of ordinary skill in the art upon reading the following detailed description of preferred embodiments.

Accompanying drawings are merely used for the objective of illustrating preferred embodiments, and are not to be regarded as limiting the present disclosure.

DETAILED DESCRIPTION OF THE EMBODIMENTS

In order to make objectives, technical solutions, and advantages of examples of the present disclosure clearer, technical solutions in examples of the present disclosure will be clearly and completely described below in combination accompanying drawings in the examples of the present disclosure. Apparently, the described examples are part of the present disclosure, rather than all of them. On the basis of examples of the present disclosure, all other examples obtained by those of ordinary skill in the art without making creative efforts fall within the scope of protection of the present disclosure.

Those skilled in the art can understand that singular forms "a/an", "one", "the" and "this" used herein may also include plural forms unless expressly stated. It should be further understood that word "include" used in the description of the present disclosure means presence of stated features, integers, steps, operations, elements and/or assemblies, but does not exclude the presence or addition of one or more other features, integers, steps, operations, elements, assemblies and/or groups thereof.

Example 1

Figure 1:
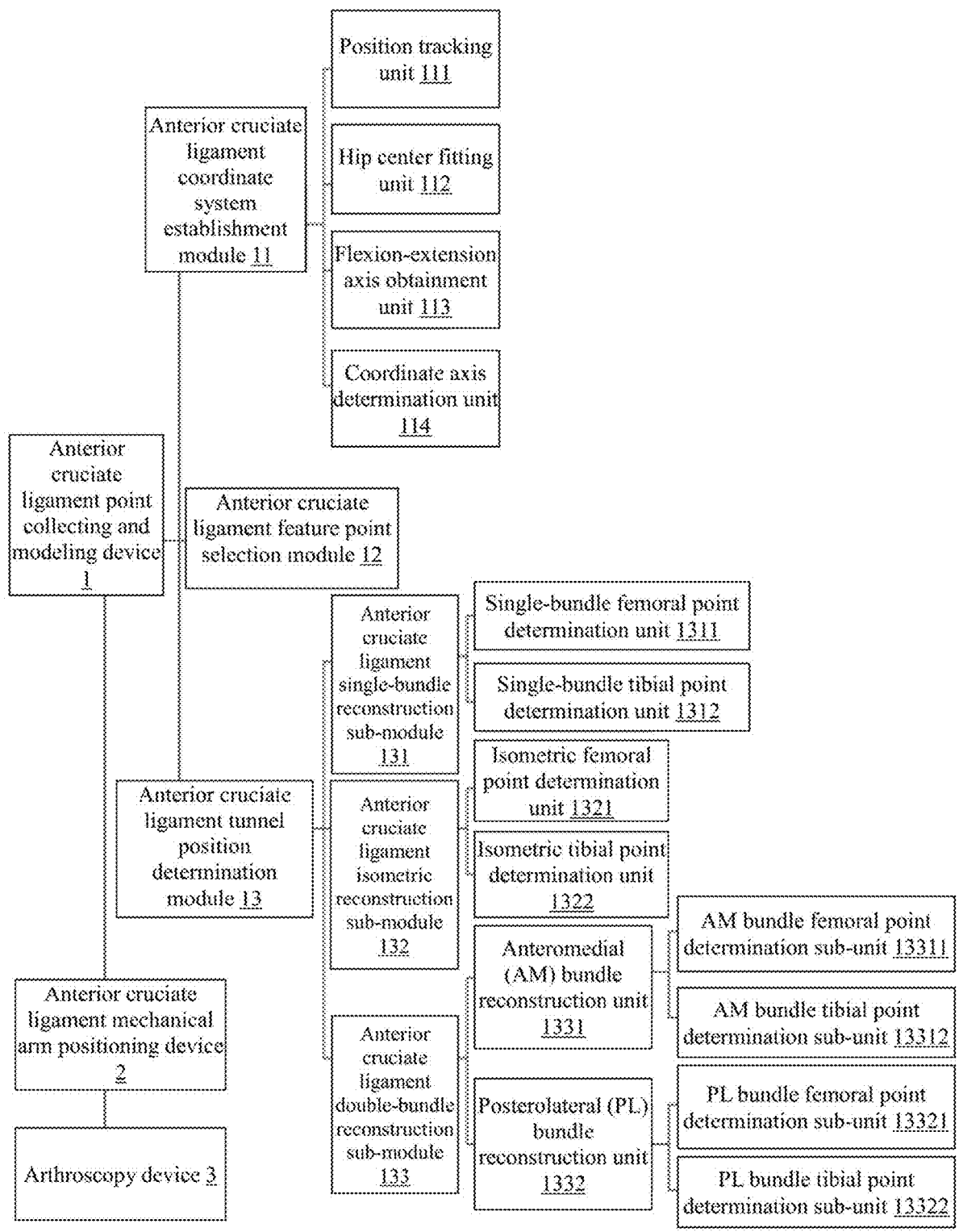
FIG. 1 is an overall structural diagram of a tunnel position determination system for anterior cruciate ligament reconstruction according to Example 1 of the present disclosure.
Figure 2:
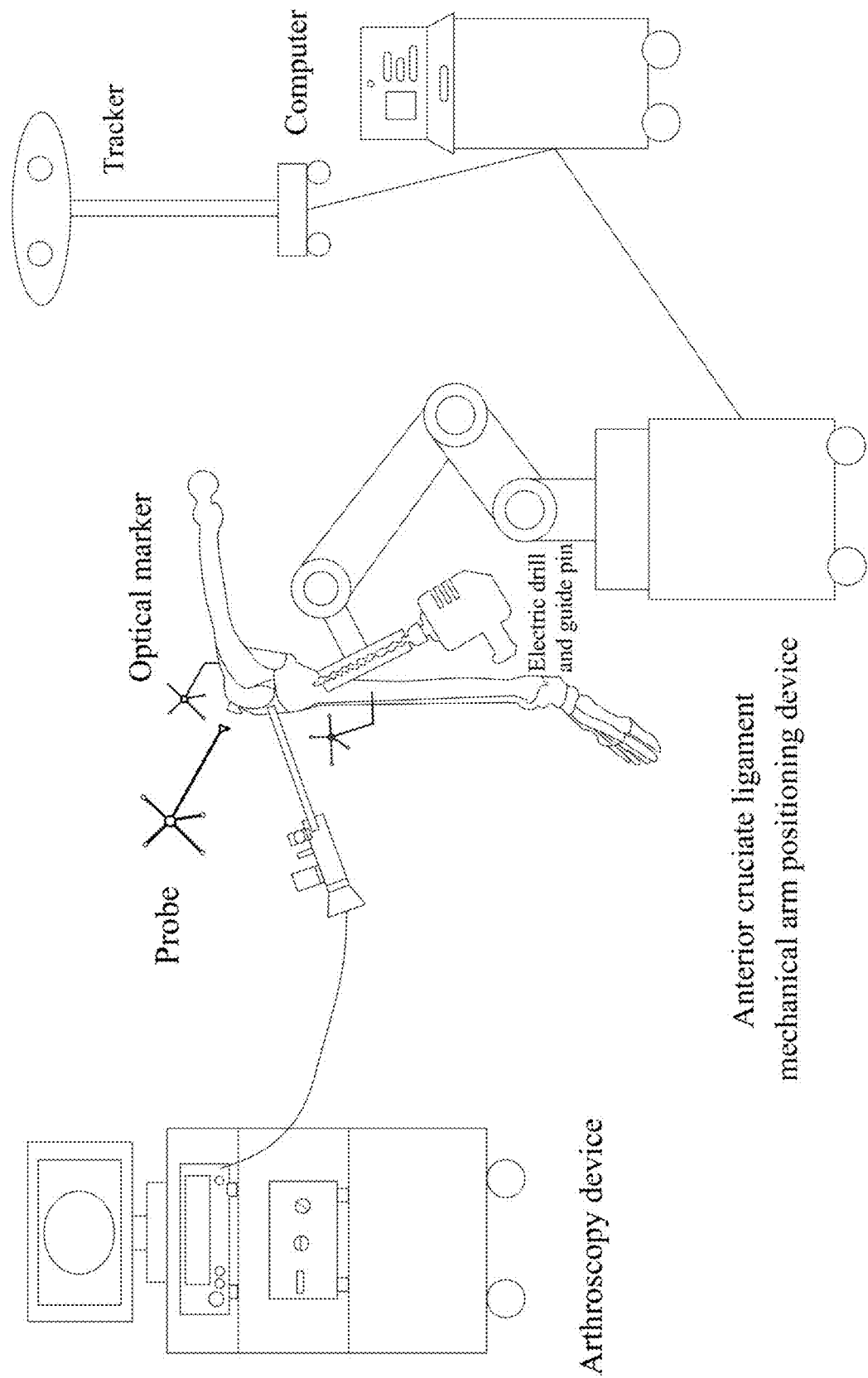
FIG. 2 is an overall schematic diagram of a tunnel position determination system for anterior cruciate ligament reconstruction according to Example 1 of the present disclosure.

As shown in FIGS. 1 and 2, the example provides a tunnel position determination system for anterior cruciate ligament reconstruction. The system includes:

a point collecting and modeling device 1 for determining a specific tunnel position of a reconstruction tunnel and specifically including:

a coordinate system establishment module 11 for establishing two coordinate systems including a femoral coordinate system based on a femur and a tibial coordinate system based on a tibia.

Specifically, in order to conveniently select a femoral point and a tibial point of a tunnel in a tunnel reconstruction process subsequently, and in the case that a position of a femur or a tibia is not fixed, the situation that a coordinate system is not unified due to rotation of the femur and the tibia, such that points are difficult to select may not occur. It is required to establish a femoral coordinate system and a tibial coordinate system for the femur and the tibia respectively in advance, and the femoral point is selected according to the femoral coordinate system, and the tibial point is selected according to the tibial coordinate system subsequently.

It should be noted that a specific method for establishing a femoral coordinate system and a tibial coordinate system is not limited in the present disclosure, and it is only required to provide a reference for selection of the femoral point and the tibial point after the coordinate systems are established.

Figure 3:
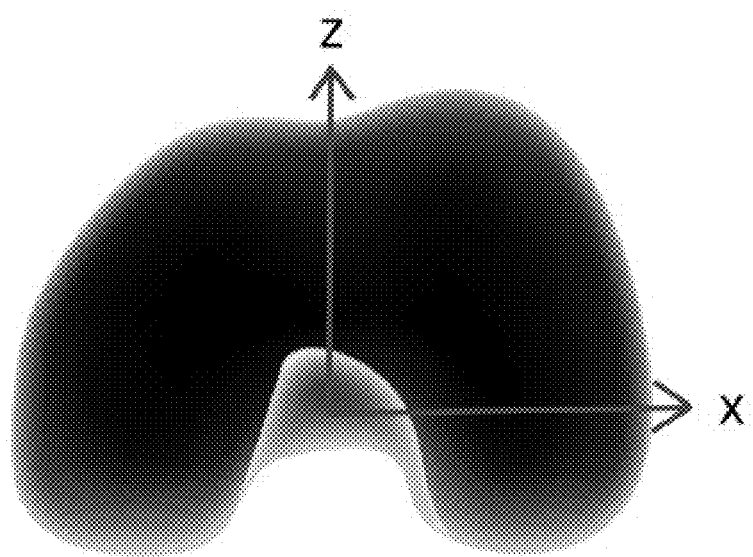
FIG. 3 is a schematic diagram of a femoral coordinate system according to Example 1 of the present disclosure.
Figure 4:
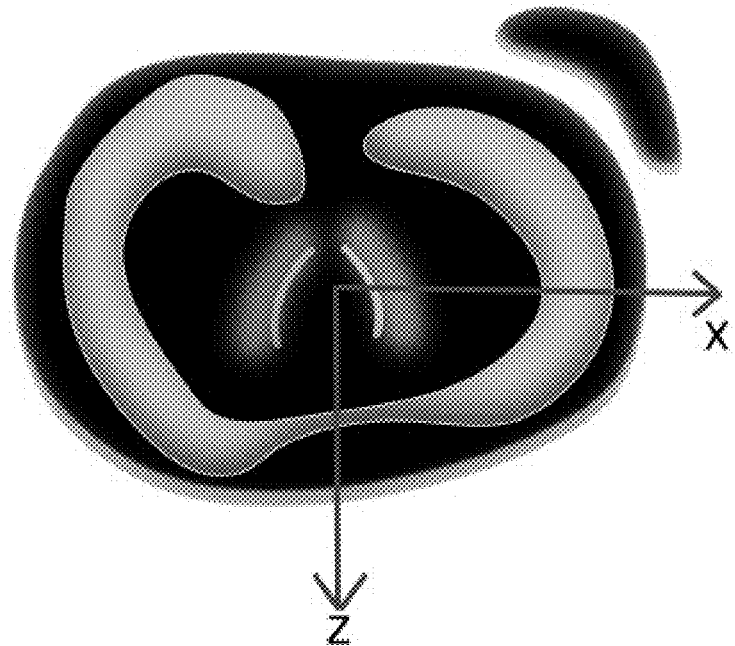
FIG. 4 is a schematic diagram of a tibial coordinate system according to Example 1 of the present disclosure.

As shown in FIG. 3 (a femoral coordinate system) and FIG. 4 (a tibial coordinate system), a module corresponding to the specific method for establishing a femoral coordinate system and a tibial coordinate system is listed. The module specifically include:

a position tracking unit 111 for fixing an optical femoral marker and an optical tibial marker on the femur and the tibia respectively, and tracking a position of the femur and a position of the tibia in real time by an optical tracker;

a hip center fitting unit 112 for obtaining a femoral position data set of the optical femoral marker under the optical tracker, and fitting the femoral position data set to compute a hip midpoint;

a flexion-extension axis obtainment unit 113 for obtaining a tibial position data set of the optical tibial marker under the optical tracker, fitting the tibial position data set to obtain a plane, taking a normal line of the plane as a flexion-extension axis of the tibia, and taking the flexion-extension axis as a femoral x-axis of the femoral coordinate system and a tibial x-axis of the tibial coordinate system; and a coordinate axis determination unit 114 for obtaining position information of a knee midpoint and an ankle midpoint, taking a connecting line between the knee midpoint and the hip midpoint as a femoral y-axis of the femoral coordinate system, establishing a femoral z-axis by means of a cross product of the femoral x-axis and the femoral y-axis, and taking the knee midpoint as an origin of the femoral coordinate system, such that the femoral coordinate system is established; and taking a connecting line between the knee midpoint and the ankle midpoint as a tibial y-axis of the tibial coordinate system, establishing a tibial z-axis by means of a cross product of the tibial x-axis and the tibial y-axis, and taking the knee midpoint as an origin of the tibial coordinate system, such that the tibial coordinate system is established.

Figure 5:
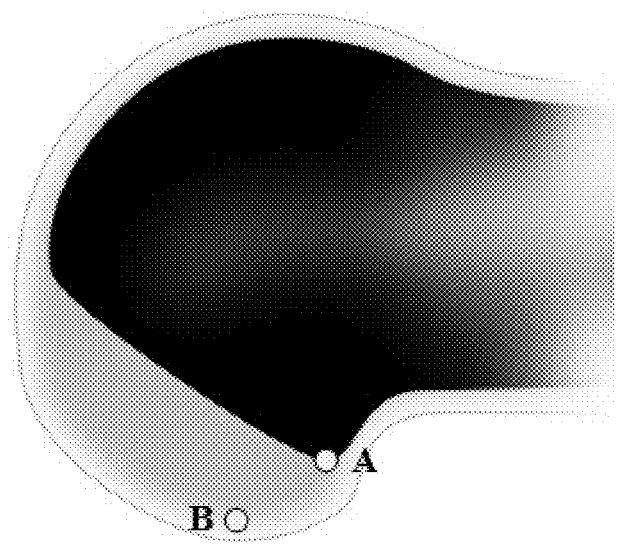
FIG. 5 is a schematic diagram of selecting femoral feature points according to Example 1 of the present disclosure.
Figure 6:
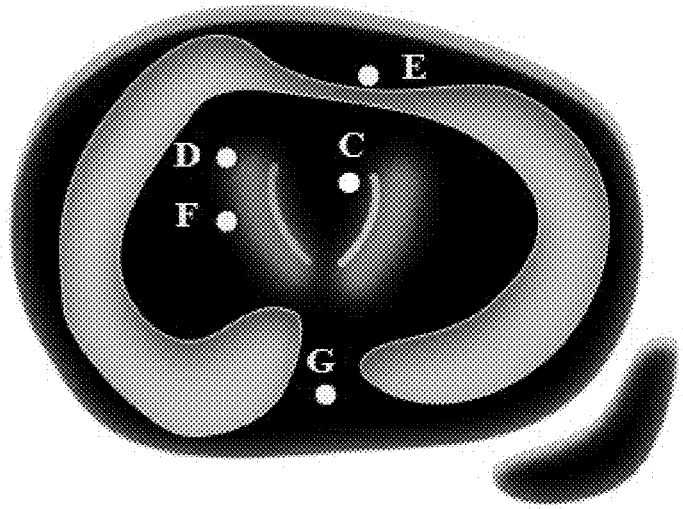
FIG. 6 is a schematic diagram of selecting tibial feature points according to Example 1 of the present disclosure.

The point collecting and modeling device further includes a feature point selection module 12 for selecting femoral feature points (a lateral malleolar view of a femoral section as shown in FIG. 5) including an over-the-top point A and a lower reference point B, and tibial feature points (a tibial plateau view as shown in FIG. 6) including a medial intercondylar crest lateral slope surface C, a lateral meniscus anterior horn free edge D, a transverse knee ligament midpoint E, a lateral intercondylar crest top point F, and a tibial plateau PCL anterior edge G by means of a probe under an arthroscope.

Specifically, in this step, before the femoral point and the tibial point for tunnel reconstruction are selected, it is required to select the plurality of bone feature points serving as reference points on the femur and the tibia, and subsequently the femoral point and the tibial point are selected according to the selected bone feature points.

The point collecting and modeling device further includes a tunnel position determination module 13 for determining a femoral point and a tibial point during reconstruction according to a preset reconstruction algorithm on the basis of the femoral feature points and the tibial feature points, and further determining the specific tunnel position of the anterior cruciate ligament reconstruction tunnel by means of the femoral point and the tibial point.

Specifically, the tunnel position determination module 13 is configured to establish the reconstruction tunnel through any one of an anterior cruciate ligament single-bundle reconstruction algorithm, an anterior cruciate ligament isometric reconstruction algorithm and an anterior cruciate ligament double-bundle reconstruction algorithm, and further includes an anterior cruciate ligament single-bundle reconstruction sub-module 131, an anterior cruciate ligament isometric reconstruction sub-module 132 and an anterior cruciate ligament double-bundle reconstruction sub-module 133 that are used for executing the anterior cruciate ligament single-bundle reconstruction algorithm, the anterior cruciate ligament isometric reconstruction algorithm and the anterior cruciate ligament double-bundle reconstruction algorithm respectively. During practical application, a tunnel path may be reconstructed through any one of the algorithms.

(1) Anterior Cruciate Ligament Single-Bundle Reconstruction Algorithm

This algorithm is implemented by means of the anterior cruciate ligament single-bundle reconstruction sub-module 131 that specifically includes:

a single-bundle femoral point determination unit 1311 for determining the femoral point of the reconstruction tunnel on the basis of the femoral feature points, which specifically includes: move a preset distance in a positive direction of the z-axis of the femoral coordinate system by taking the lower reference point as a reference point, and move a preset distance towards an over-the-top point; and a single-bundle tibial point determination unit 1312 for determining the tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge.

In the case of the single-bundle femoral point determination unit 1311, moving is carried out by a preset distance ranging from 4 mm to 5 mm in the positive direction of the z-axis of the femoral coordinate system by taking the lower reference point as the reference point, and moving is carried out by a preset distance ranging from 4 mm to 5 mm towards the over-the-top point.

(2) Anterior Cruciate Ligament Isometric Reconstruction Algorithm

This algorithm is implemented by the anterior cruciate ligament isometric reconstruction sub-module 132 that specifically includes:

an isometric femoral point determination unit 1321 for determining the femoral point of the reconstruction tunnel on the basis of the femoral feature points, which specifically includes: move preset distances in a negative direction of the y-axis and in a positive direction of the z-axis of the femoral coordinate system by taking the over-the-top point as a reference; and an isometric tibial point determination unit 1322 for determining the tibial point of the reconstruction tunnel on the basis of the tibial feature points, which specifically includes: enable a sagittal line passing through a medial intercondylar crest lateral slope surface to intersect a horizontal line passing through a tibial plateau PCL anterior edge by a preset distance in a positive direction of the z-axis of the tibial coordinate system.

In the case of the isometric femoral point determination unit 1321, moving is carried out by a preset distance ranging from 6 mm to 8 mm in the negative direction of the y-axis and by a preset distance ranging from 6 mm to 8 mm in the positive direction of the z-axis of the femoral coordinate system by taking the over-the-top point as the reference. In the case of the isometric tibial point determination unit 1322, the sagittal line passing through a medial intercondylar crest lateral slope surface intersects the horizontal line passing through a tibial plateau PCL anterior edge by a preset distance ranging from 6 mm to 8 mm in the positive direction of the z-axis of the tibial coordinate system.

(3) Anterior cruciate ligament double-bundle reconstruction algorithm The algorithm includes: reconstruct two reconstruction tunnels including an anteromedial (AM) bundle and a posterolateral (PL) bundle.

The algorithm is implemented by the anterior cruciate ligament double-bundle reconstruction sub-module 133 that specifically includes an AM bundle reconstruction unit 1331 and a PL bundle reconstruction unit 1332.

In the case of an AM bundle, the AM bundle reconstruction unit 1331 is used for reconstructing the AM bundle in the two reconstruction tunnels and further includes:

an AM bundle femoral point determination sub-unit 13311 for determining the femoral point of the reconstruction tunnel on the basis of the femoral feature points, which specifically includes: select a midpoint of an over-the-top point and a lower reference point; and an AM bundle tibial point determination sub-unit 13312 for determining the tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge and a transverse knee ligament midpoint.

In the case of a PL bundle, the PL bundle reconstruction unit 1332 is used for reconstructing the PL bundle in the two reconstruction tunnels and further includes:

a PL bundle femoral point determination sub-unit 13321 for determining the femoral point of the reconstruction tunnel on the basis of the femoral feature points, which specifically includes: move a preset distance in a positive direction of the z-axis of the femoral coordinate system by taking the lower reference point as a reference point; and a PL bundle tibial point determination sub-unit 13322 for determining the tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge and a lateral intercondylar crest top point minpoint.

In the case of the PL bundle femoral point determination sub-unit 13321, moving is carried out by a preset distance specifically ranging from 4 mm to 5 mm in the positive direction of the z-axis of the femoral coordinate system by taking the lower reference point as the reference point.

It should be noted that the preset distances ranging from 4 mm to 5 mm, 6 mm-8 mm, etc. listed above are the best preset distances selected as experience accumulates during actual surgery. During actual application, more proper preset distances may be selected according to actual situations or as experience continuously accumulates.

Moreover, in the cases of the femoral point and the tibial point, the position of the femoral point and the position of the tibial point may be directly selected to determine the position of the tunnel; or a ligament attachment site footprint area boundary (obtained through multi-point selection or continuous drawing) is drawn by means of a probe under an arthroscope, and then the femoral point and tibial point are selected according to a required tunnel diameter, so as to determine the position of the reconstruction tunnel.

Further, the tunnel position determination system for anterior cruciate ligament reconstruction further includes:

a mechanical arm positioning device 2 for being connected to the point collecting and modeling device to carry out physically assisted positioning on the reconstruction tunnel according to the determined specific tunnel position of the reconstruction tunnel, so as to guide anterior cruciate ligament surgery; and an arthroscopy device 3 for observing an inner structure of a joint to undergo surgery, and monitoring an anterior cruciate ligament reconstruction surgery process in real time, where the point collecting and modeling device is used for determining the specific tunnel position of the reconstruction tunnel according to the inner structure of the joint to undergo surgery.

Preferably, the arthroscopy device 3 includes a hollow rod, lenses, optical fibers and a photographing device are fixed in the hollow rod, the photographing device is connected to a display device, the hollow rod is connected to a power device, and an end of the hollow rod is guided into a joint by means of the power device.

Preferably, the point collecting and modeling device 1 includes a probe, a tracker and a computer, the probe is connected to the tracker, and the tracker is connected to the computer.

Preferably, the probe is used for collecting a plurality of sampling points under an arthroscope, the tracker transmits the sampling points to the computer, the plurality of sampling points form a sampling point set, and the computer establishes a three-dimensional coordinate system and a tunnel spatial path model according to the sampling point set, and determines positions of tibial and femoral tunnel inner orifices according to a predetermined algorithm.

Preferably, the mechanical arm positioning device 2 includes a mechanical arm, and a hollow sleeve is arranged at an end of the mechanical arm.

Preferably, the mechanical arm is a seven-degree-of-freedom mechanical arm.

Preferably, an inner diameter of the hollow sleeve is greater than an inner diameter of the tunnel.

After the tunnel position for anterior cruciate ligament reconstruction is obtained by means of the above system, the reconstruction tunnel may be taken as a pin entry channel for anterior cruciate ligament reconstruction, and an anterior cruciate ligament graft is grafted to implement posterior cruciate ligament reconstruction.

Example 2

Figure 7:
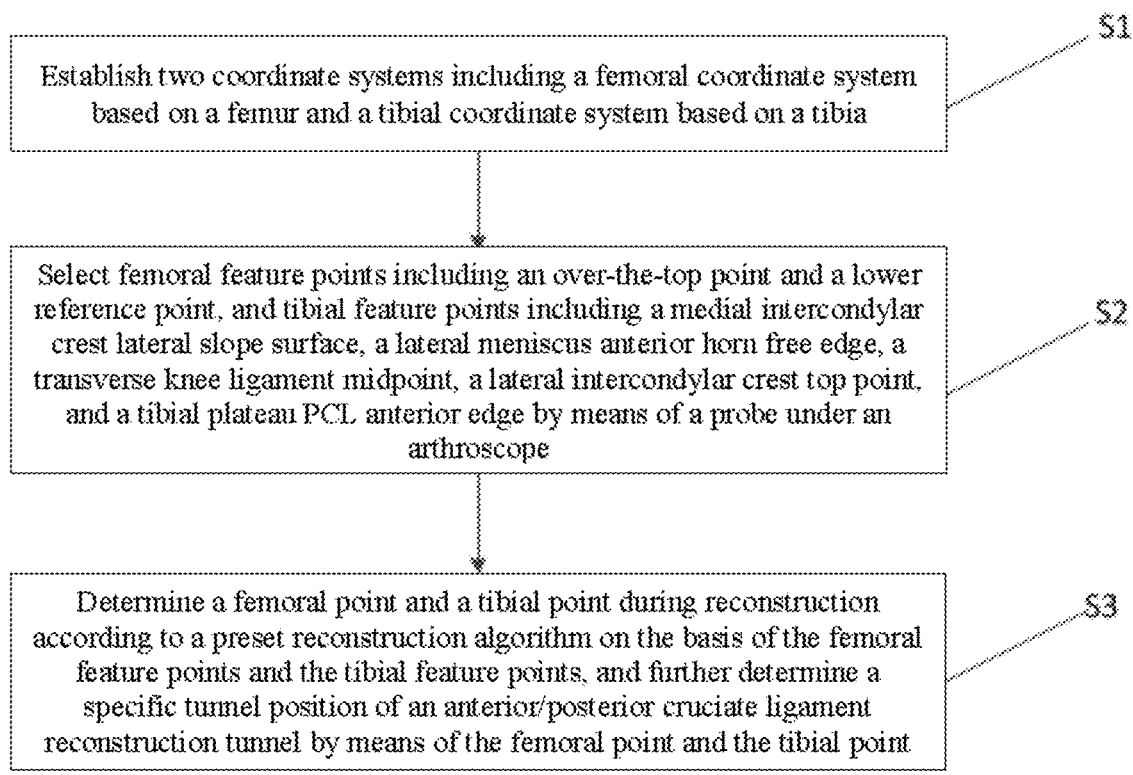
FIG. 7 is an overall flow diagram of a tunnel position determination method for anterior cruciate ligament reconstruction according to Example 2 of the present disclosure.

As shown in FIG. 7, the example provides a tunnel position determination method for anterior cruciate ligament reconstruction by the tunnel position determination system for anterior cruciate ligament reconstruction in Example 1. The method includes steps as follows:

S1: establish two coordinate systems including a femoral coordinate system based on a femur and a tibial coordinate system based on a tibia;

S2: select femoral feature points including an over-the-top point and a lower reference point, and tibial feature points including a medial intercondylar crest lateral slope surface, a lateral meniscus anterior horn free edge, a transverse knee ligament midpoint, a lateral intercondylar crest top point, and a tibial plateau PCL anterior edge by means of a probe under an arthroscope;

S3: determine a femoral point and a tibial point during reconstruction according to a preset reconstruction algorithm on the basis of the femoral feature points and the tibial feature points, and further determine a specific tunnel position of an anterior cruciate ligament reconstruction tunnel by means of the femoral point and the tibial point.

Further, the step S1 of establishing two coordinate systems including a femoral coordinate system based on a femur and a tibial coordinate system based on a tibia specifically includes:

S11: fix an optical femoral marker and an optical tibial marker on the femur and the tibia respectively, and track a position of the femur and a position of the femur in real time by an optical tracker;

S12: obtain a femoral position data set of the optical femoral marker under the optical tracker, and compute a hip midpoint by fitting the femoral position data set;

S13: obtain a tibial position data set of the optical tibial marker under the optical tracker, fit the tibial position data set to obtain a plane, take a normal line of the plane as a flexion-extension axis of the tibia, and take the flexion-extension axis as a femoral x-axis of the femoral coordinate system and a tibial x-axis of the tibial coordinate system;

S14: obtain position information of a knee midpoint and an ankle midpoint, take a connecting line between the knee midpoint and the hip midpoint as a femoral y-axis of the femoral coordinate system, establish a femoral z-axis by means of a cross product of the femoral x-axis and the femoral y-axis, and take the knee midpoint as an origin of the femoral coordinate system, such that the femoral coordinate system is established; and take a connecting line between the knee midpoint and the ankle midpoint as a tibial y-axis of the tibial coordinate system, establish a tibial z-axis by means of a cross product of the tibial x-axis and the tibial y-axis, and take the knee midpoint as an origin of the tibial coordinate system, such that the tibial coordinate system is established.

Further, in the step S3, the anterior cruciate ligament reconstruction tunnel is reconstructed through any one of an anterior cruciate ligament single-bundle reconstruction algorithm, an anterior cruciate ligament isometric reconstruction algorithm and an anterior cruciate ligament double-bundle reconstruction algorithm.

Further, the anterior cruciate ligament single-bundle reconstruction algorithm specifically includes:
determine the femoral point of the reconstruction tunnel on the basis of the femoral feature points, which specifically includes: move a preset distance in a positive direction of the z-axis of the femoral coordinate system by taking the lower reference point as a reference point, and move a preset distance towards the over-the-top point; and
determine the tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge.

Further, the anterior cruciate ligament single-bundle reconstruction algorithm further includes:
move, when the femoral point of an anterior cruciate ligament single bundle is determined, a preset distance ranging from 4 mm to 5 mm in the positive direction of the z-axis of the femoral coordinate system by taking the lower reference point as the reference point, and move a preset distance ranging from 4 mm to 5 mm towards the over-the-top point.

Further, the anterior cruciate ligament isometric reconstruction algorithm specifically includes:
determine the femoral point of the reconstruction tunnel on the basis of the femoral feature points, which specifically includes: move a preset distance in a negative direction of the y-axis and a preset distance in a positive direction of the z-axis of the femoral coordinate system by taking an over-the-top point as a reference; and
determine the tibial point of the reconstruction tunnel on the basis of the tibial feature points, which specifically includes: enable a sagittal line passing through a medial intercondylar crest lateral slope surface to intersect a horizontal line passing through a tibial plateau PCL anterior edge by a preset distance in a positive direction of the z-axis of the tibial coordinate system.

Further, the anterior cruciate ligament isometric reconstruction algorithm further includes:
move, when the femoral point for anterior cruciate ligament isometric reconstruction is determined, a preset distance ranging from 6 mm to 8 mm in a negative direction of the y-axis and a preset distance ranging from 6 mm to 8 mm in a positive direction of the z-axis of the femoral coordinate system by taking an over-the-top point as a reference; and enable, when the tibial point for anterior cruciate ligament isometric reconstruction is determined, a sagittal line passing through a medial intercondylar crest lateral slope surface to intersect a horizontal line passing through a tibial plateau PCL anterior edge by a preset distance ranging from 6 mm to 8 mm in a positive direction of the z-axis of the tibial coordinate system.

Further, the anterior cruciate ligament double-bundle reconstruction algorithm includes: reconstruct two reconstruction tunnels including an AM bundle and a PL bundle.

The step of reconstructing the AM bundle specifically includes:
determine an AM bundle femoral point of the reconstruction tunnel on the basis of the femoral feature points, which specifically includes: select a midpoint of an over-the-top point and a lower reference point; and
determine an AM bundle tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge and a transverse knee ligament midpoint.

The step of reconstructing the PL bundle specifically includes:
determine a PL bundle femoral point of the reconstruction tunnel on the basis of the femoral feature points, which specifically includes: move a preset distance in a positive direction of the z-axis of the femoral coordinate system by taking the lower reference point as a reference point; and
determine a PL bundle tibial point of the reconstruction tunnel on the basis of the tibial feature points, which specifically includes: enable a sagittal line passing through a medial intercondylar crest lateral slope surface to intersect a horizontal line passing through a lateral meniscus anterior horn free edge and a lateral intercondylar crest top point minpoint.

Further, the anterior cruciate ligament double-bundle reconstruction algorithm further includes:
move, when the PL bundle femoral point is determined, a preset distance specifically ranging from 4 mm to 5 mm in the positive direction of the z-axis of the femoral coordinate system by taking the lower reference point as the reference point.

Example 3

Figure 8:
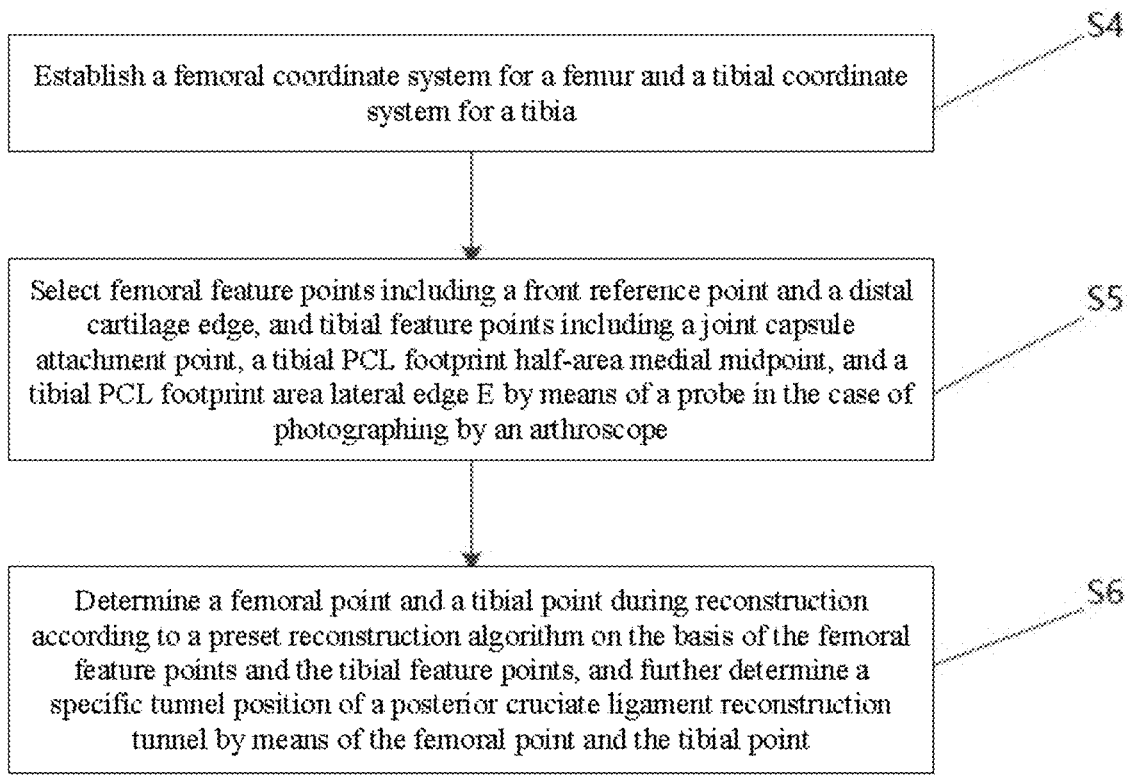
FIG. 8 is an overall flow diagram of a tunnel determination method applied before posterior cruciate ligament reconstruction according to Example 3 of the present disclosure.

As shown in FIG. 8, the example provides a tunnel determination method applied before posterior cruciate ligament reconstruction. The method includes steps as follows:
S4: establish a femoral coordinate system for femur and a tibial coordinate system for tibia.

Specifically, in order to conveniently select a femoral point and a tibial point of a tunnel in a tunnel reconstruction process subsequently, and in the case that a position of a femur or a tibia is not fixed, the situation that a coordinate system is not unified due to rotation of the femur and the tibia, such that points are difficult to select may not occur. It is required to establish a femoral coordinate system and a tibial coordinate system for the femur and the tibia respectively in advance, and the femoral point is selected according to the femoral coordinate system, and the tibial point is selected according to the tibial coordinate system subsequently.

It should be noted that a specific method for establishing a femoral coordinate system and a tibial coordinate system is not limited in the present disclosure, and it is only required to provide a reference for selection of the femoral point and the tibial point after the coordinate systems are established.

Figure 9:
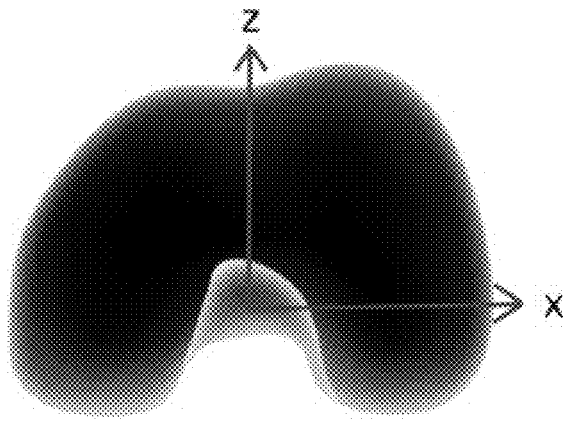
FIG. 9 is a schematic diagram of a femoral coordinate system according to Example 3 of the present disclosure.
Figure 10:
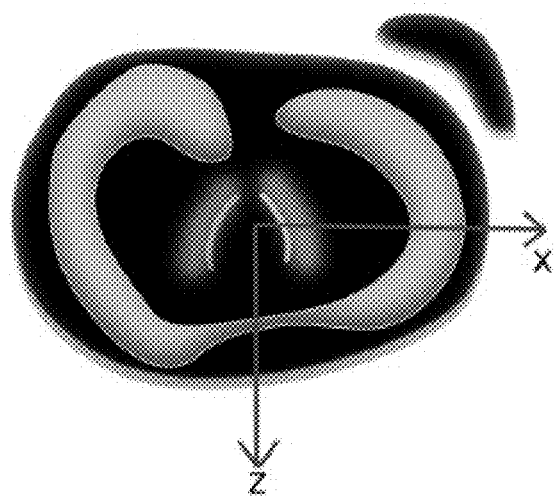
FIG. 10 is a schematic diagram of a tibial coordinate system according to Example 3 of the present disclosure.

As shown in FIG. 9 (a femoral coordinate system) and FIG. 10 (a tibial coordinate system), a specific method for establishing a femoral coordinate system and a tibial coordinate system is listed. The method specifically includes steps as follows:

S41: fix an optical femoral marker and an optical tibial marker on the femur and the tibia respectively, and track a position of the femur and a position of the tibia in real time by an optical tracker;

S42: obtain a femoral position data set of the optical femoral marker under the optical tracker, and compute a hip midpoint by fitting the femoral position data set;

S43: obtain a tibial position data set of the optical tibial marker under the optical tracker, fit the tibial position data set to obtain a plane, take a normal line of the plane as a flexion-extension axis of the tibia, and take the flexion-extension axis as a femoral x-axis of the femoral coordinate system and a tibial x-axis of the tibial coordinate system; and S44: obtain position information of a knee midpoint and an ankle midpoint, take a connecting line between the knee midpoint and the hip midpoint as a femoral y-axis of the femoral coordinate system, establish a femoral z-axis by means of a cross product of the femoral x-axis and the femoral y-axis, and take the knee midpoint as an origin of the femoral coordinate system, such that the femoral coordinate system is established; and take a connecting line between the knee midpoint and the ankle midpoint as a tibial y-axis of the tibial coordinate system, establish a tibial z-axis by means of a cross product of the tibial x-axis and the tibial y-axis, and take the knee midpoint as an origin of the tibial coordinate system, such that the tibial coordinate system is established.

Figure 11:
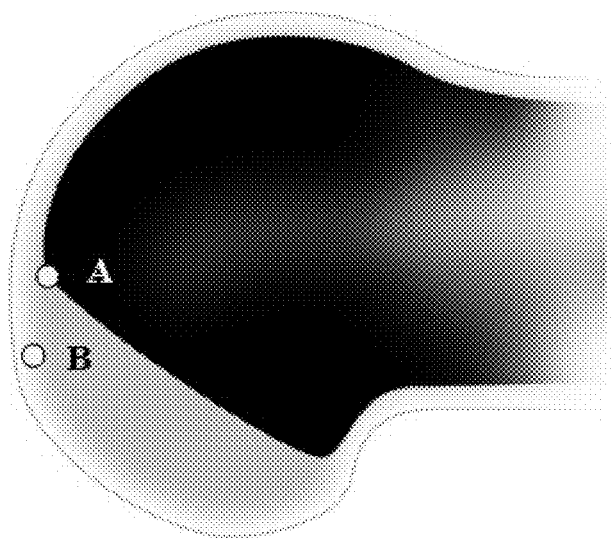
FIG. 11 is a schematic diagram of selecting femoral feature points according to Example 3 of the present disclosure.
Figure 12:
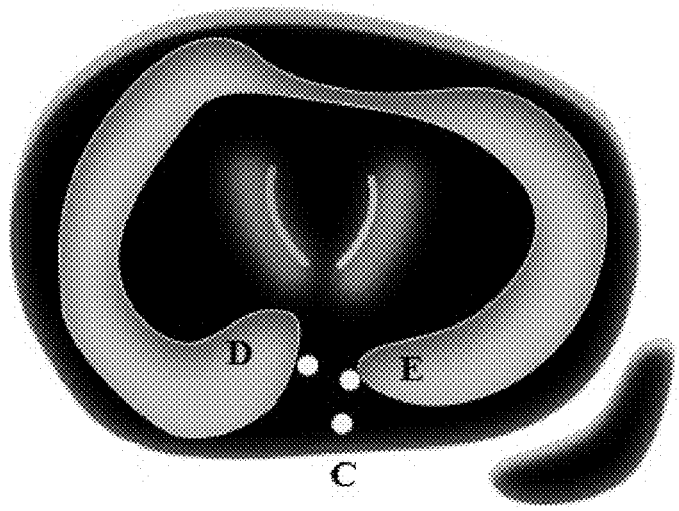
FIG. 12 is a schematic diagram of selecting tibial feature points according to Example 3 of the present disclosure.

The method further includes S5: select femoral feature points (a medial malleolar view of a femoral section as shown in FIG. 11) including a front reference point A and a distal cartilage edge B, and tibial feature points (a tibial plateau view as shown in FIG. 12) including a joint capsule attachment point C, a tibial PCL footprint half-area medial midpoint D, and a tibial PCL footprint area lateral edge E by means of a probe in the case of photographing by an arthroscope.

Specifically, in this step, before the femoral point and the tibial point for tunnel reconstruction are selected, it is required to select the plurality of bone feature points serving as reference points on the femur and the tibia, and subsequently the femoral point and the tibial point are selected according to the selected bone feature points.

The method further includes S6: determine a femoral point and a tibial point during reconstruction according to a preset reconstruction algorithm on the basis of the femoral feature points and the tibial feature points, and further determine a specific tunnel position of a posterior cruciate ligament reconstruction tunnel by means of the femoral point and the tibial point.

Specifically, in the present disclosure, a posterior cruciate ligament reconstruction tunnel may be reconstructed through a plurality of methods, and different tunnels may be reconstructed according to different reconstruction algorithms. In the example, two algorithms including a posterior cruciate ligament single-bundle reconstruction algorithm and a posterior cruciate ligament double-bundle reconstruction algorithm are specifically listed, and any one of the two algorithms may be used during actual surgery.

Specific methods for selecting points through the two reconstruction algorithms are as follows:

(1) Posterior Cruciate Ligament Single-Bundle Reconstruction Algorithm

This algorithm includes: determine the tibial point of the reconstruction tunnel on the basis of the tibial feature points, which specifically includes: move a fixed distance (ranging from 6 mm to 8 mm) in a positive direction of the z-axis of the tibial coordinate system by taking a joint capsule attachment point as a reference point to reach an outer side of a posterior concave center line at a proximal end of the tibia, and enable a direction to form an angle of 45 degrees relative to a tibial longitudinal axis; and determine the femoral point of the reconstruction tunnel on the basis of the femoral feature points, which specifically includes: select a point spaced from a front reference point by a fixed distance (ranging from 11 mm to 13 mm) and spaced from a distal cartilage edge by a fixed distance (ranging from 6 mm to 8 mm) as the femoral point, and enable a direction to satisfy a requirement that an anterolateral approach may reach a fixed point.

(2) Posterior cruciate ligament double-bundle reconstruction algorithm. This algorithm includes: reconstruct two reconstruction tunnels including a posteromedial (PM) bundle and an anterolateral (AL) bundle.

The tibial point specifically includes:

a PM bundle inner orifice, where a joint capsule attachment point is moved towards a front side by a fixed distance (ranging from 6 mm to 8 mm) in a positive direction of the z-axis of the tibial coordinate system to reach a tibial PCL footprint half-area medial midpoint; and an AL bundle inner orifice, where a joint capsule attachment point is moved towards a front side by a fixed distance (ranging from 6 mm to 8 mm) in a positive direction of the z-axis of the tibial coordinate system to reach a tibial PCL footprint area lateral edge.

The PM bundle inner orifice and the AL bundle inner orifice are required to be spaced from each other by a fixed distance (10 mm or above), or the AL bundle is translated towards an outer side by a fixed distance (ranging from 9 mm to 11 mm) from the PM bundle.

A direction allows the PM bundle to form an angle of 45 degrees relative to a tibial longitudinal axis, an outer orifice of the reconstruction tunnel is spaced from a tibial anterior crest by a fixed distance (ranging from 18 mm to 22 mm), and the AL bundle is parallel to the PM bundle.

The femoral point specifically includes:

an AL bundle inner orifice, where a point spaced from a front reference point by a fixed distance (ranging from 11 mm to 13 mm) and spaced from a distal cartilage edge by a fixed distance (ranging from 6 mm to 8 mm) is selected as the femoral point, and a direction is required to satisfy a requirement that an anterolateral approach may reach a fixed point; and a PM bundle inner orifice that is spaced from the AL bundle by a fixed distance (ranging from 6 mm to 7 mm) and spaced from the nearest cartilage edge by a fixed distance (ranging from 6 mm to 7 mm).

A direction is required to satisfy a requirement that an anterolateral approach may reach a fixed point, and the AL bundle is parallel to the PM bundle.

It should be noted that the ranges of the preset distances listed above are the best preset distances selected as experience accumulates during actual surgery. During actual application, more proper preset distances may be selected according to actual situations or as experience continuously accumulates.

Moreover, in the cases of the femoral point and the tibial point, the position of the femoral point and the position of the tibial point may be directly selected to determine the position of the tunnel; or a ligament attachment site footprint area boundary (obtained through multi-point selection or continuous drawing) is drawn by means of a probe under an arthroscope, and then the femoral point and tibial point are selected according to a required tunnel diameter, so as to determine the position of the reconstruction tunnel.

After a position of a reconstruction tunnel of a posterior cruciate ligament is determined, during subsequent posterior cruciate ligament reconstruction surgery, the reconstruction tunnel is taken as a pin entry channel for posterior cruciate ligament reconstruction, and a posterior cruciate ligament graft is grafted to implement posterior cruciate ligament reconstruction.

Specifically, in this step, after a path of the reconstruction tunnel is determined in the step S3, the pin entry channel may be determined according to the femoral point and the tibial point in the reconstruction tunnel, so as to implement posterior cruciate ligament reconstruction.

Example 4

The example provides a virtual system for executing the tunnel determination method applied before posterior cruciate ligament reconstruction in Example 3. The virtual system includes:

a coordinate system establishment module for establishing a femoral coordinate system for a femur and a tibial coordinate system for a tibia;

a feature point selection module for selecting femoral feature points including a front reference point and a distal cartilage edge, and tibial feature points including a joint capsule attachment point, a tibial PCL footprint half-area medial midpoint, and a tibial PCL footprint area lateral edge by means of a probe in the case of photographing by an arthroscope;

a tunnel position determination module for determining a femoral point and a tibial point during reconstruction according to a preset reconstruction algorithm on the basis of the femoral feature points and the tibial feature points, and further determining the specific tunnel position of the posterior cruciate ligament reconstruction tunnel by means of the femoral point and the tibial point.

Further, the coordinate system establishment module specifically includes:

a posterior cruciate ligament position tracking unit for fixing an optical femoral marker and an optical tibial marker on the femur and the tibia respectively, and tracking a position of the femur and a position of the tibia in real time by an optical tracker;

a posterior cruciate ligament hip center fitting unit for obtaining a femoral position data set of the optical femoral marker under the optical tracker, and fitting the femoral position data set to compute a hip midpoint;

a posterior cruciate ligament flexion-extension axis obtainment unit for obtaining a tibial position data set of the optical tibial marker under the optical tracker, fitting the tibial position data set to obtain a plane, taking a normal line of the plane as a flexion-extension axis of the tibia, and taking the flexion-extension axis as a femoral x-axis of the femoral coordinate system and a tibial x-axis of the tibial coordinate system; and a posterior cruciate ligament coordinate axis determination unit for obtaining position information of a knee midpoint and an ankle midpoint, taking a connecting line between the knee midpoint and the hip midpoint as a femoral y-axis of the femoral coordinate system, establishing a femoral z-axis by means of a cross product of the femoral x-axis and the femoral y-axis, and taking the knee midpoint as an origin of the femoral coordinate system, such that the femoral coordinate system is established; and taking a connecting line between the knee midpoint and the ankle midpoint as a tibial y-axis of the tibial coordinate system, establishing a tibial z-axis by means of a cross product of the tibial x-axis and the tibial y-axis, and taking the knee midpoint as an origin of the tibial coordinate system, such that the tibial coordinate system is established.

Further, the tunnel position determination module is configured to establish the reconstruction tunnel through any one of a posterior cruciate ligament single-bundle reconstruction algorithm and a posterior cruciate ligament double-bundle reconstruction algorithm, and further includes a posterior cruciate ligament single-bundle reconstruction sub-module and a posterior cruciate ligament double-bundle reconstruction sub-module that are used for executing the posterior cruciate ligament single-bundle reconstruction algorithm and the posterior cruciate ligament double-bundle reconstruction algorithm respectively.

Further, the posterior cruciate ligament single-bundle reconstruction sub-module specifically includes:

a posterior cruciate ligament single-bundle tibial point determination unit for determining the tibial point of the reconstruction tunnel on the basis of the tibial feature points, which specifically includes: move a fixed distance in a positive direction of the z-axis of the tibial coordinate system by taking a joint capsule attachment point as a reference point to reach an outer side of a posterior concave center line at a proximal end of the tibia, and enable a direction to form an angle of 45 degrees relative to a tibial longitudinal axis; and a posterior cruciate ligament single-bundle femoral point determination unit for determining the femoral point of the reconstruction tunnel on the basis of the femoral feature points, which specifically includes: select a point spaced from a front reference point by a fixed distance and spaced from a distal cartilage edge by a fixed distance as the femoral point, and enable a direction to satisfy a requirement that an anterolateral approach may reach a fixed point.

Further, the posterior cruciate ligament single-bundle reconstruction sub-module further includes:

the posterior cruciate ligament single-bundle tibial point determination unit, where moving is carried out by a fixed distance ranging from 6 mm to 8 mm in the positive direction of the z-axis of the tibial coordinate system by taking the joint capsule attachment point as the reference point; and the posterior cruciate ligament single-bundle femoral point determination unit, where a point spaced from the front reference point by a fixed distance ranging from 11 mm to 13 mm and spaced from a distal cartilage edge by a fixed distance ranging from 6 mm to 8 mm is selected as the femoral point.

Further, the posterior cruciate ligament double-bundle reconstruction sub-module specifically includes:

a double-bundle tibial point determination unit for determining the tibial point for tunnel reconstruction in the posterior cruciate ligament double-bundle reconstruction algorithm and further including:

a tibial point PM bundle inner orifice determination sub-unit for determining a PM bundle inner orifice of the tibial point in the posterior cruciate ligament double-bundle reconstruction algorithm, which specifically includes: move a joint capsule attachment point towards a front side by a fixed distance in a positive direction of the z-axis of the tibial coordinate system to reach a tibial PCL footprint half-area medial midpoint; and a tibial point AL bundle inner orifice determination sub-unit for determining an AL bundle inner orifice of the tibial point in the posterior cruciate ligament double-bundle reconstruction algorithm, which specifically includes: move a joint capsule attachment point moving towards a front side by a fixed distance in a positive direction of the z-axis of the tibial coordinate system to reach a tibial PCL footprint area lateral edge; where in the cases of the tibial point PM bundle inner orifice determination sub-unit and the tibial point AL bundle inner orifice determination sub-unit, the PM bundle inner orifice and the AL bundle inner orifice are required to be spaced from each other by a fixed distance, or the AL bundle is translated towards an outer side by a fixed distance from the PM bundle; and a direction allows the PM bundle to form an angle of 45 degrees relative to a tibial longitudinal axis, an outer orifice of the reconstruction tunnel is spaced from a tibial anterior crest by a fixed distance, and the AL bundle is parallel to the PM bundle; and a femoral point determination unit for determining the femoral point for tunnel reconstruction in the posterior cruciate ligament double-bundle reconstruction algorithm and further including:

a femoral point AL bundle inner orifice determination sub-unit for determining an AL bundle inner orifice of the femoral point in the posterior cruciate ligament double-bundle reconstruction algorithm, which specifically includes: select a point spaced from a front reference point by a fixed distance and spaced from a distal cartilage edge by a fixed distance as the femoral point, and enable a direction to satisfy a requirement that an anterolateral approach may reach a fixed point; and a femoral point PM bundle inner orifice determination sub-unit for determining a PM bundle inner orifice of the femoral point in the posterior cruciate ligament double-bundle reconstruction algorithm, which is specifically spaced from the AL bundle by a fixed distance and spaced from the nearest cartilage edge by a fixed distance; where in the cases of the femoral point AL bundle inner orifice determination sub-unit and the femoral point PM bundle inner orifice determination sub-unit, a direction is required to satisfy a requirement that an anterolateral approach may reach a fixed point, and the AL bundle is parallel to the PM bundle.

Further, the posterior cruciate ligament single-bundle reconstruction sub-module further includes:

the tibial point PM bundle inner orifice determination sub-unit, where the joint capsule attachment point is moved towards the front side by a fixed distance ranging from 6 mm to 8 mm in the positive direction of the z-axis of the tibial coordinate system; and the tibial point AL bundle inner orifice determination sub-unit, where the joint capsule attachment point is moved towards the front side by a fixed distance ranging from 6 mm to 8 mm in the positive direction of the z-axis of the tibial coordinate system; where when the tibial point is determined, the PM bundle inner orifice and the AL bundle inner orifice are spaced from each other by a fixed distance greater than 10 mm, or the AL bundle is translated towards the outer side by a fixed distance ranging from 9 mm to 11 mm from the PM bundle, the direction allows the PM bundle to form the angle of 45 degrees relative to the tibial longitudinal axis, and the outer orifice of the reconstruction tunnel is spaced from the tibial anterior crest by a fixed distance ranging from 18 mm to 22 mm;

the femoral point AL bundle inner orifice determination sub-unit, where a point spaced from the front reference point by a fixed distance ranging from 11 mm to 13 mm and spaced from a distal cartilage edge by a fixed distance ranging from 6 mm to 8 mm is selected as the femoral point; and the femoral point PM bundle inner orifice determination sub-unit, where a point spaced from the AL bundle by a fixed distance ranging from 6 mm to 7 mm and spaced from the nearest cartilage edge by a fixed distance ranging from 6 mm to 7 mm is selected as the femoral point.

The above examples are schematically summarized, the core principle of which is described as follows:

an intelligent control system for knee ligament reconstruction includes:

an arthroscopy system for observing an inner structure of a joint to undergo surgery, and monitoring an anterior cruciate ligament reconstruction surgery process in real time; a point collecting and modeling system connected to the arthroscopy system and used for determining a position of a tunnel according to the inner structure of the joint to undergo surgery, so as to establish a tunnel spatial path model; and a mechanical arm positioning system connected to the point collecting and modeling system and used for carrying out physically assisted positioning on the tunnel according to the tunnel spatial path model, so as to guide anterior cruciate ligament reconstruction surgery.

An intelligent control method for knee ligament reconstruction includes: S100: collect several position points within a sight range of an arthroscope system to form a sampling point set, and establish a three-dimensional coordinate system according to the sampling point set; S200: select several feature points from the three-dimensional coordinate system, and establish a tunnel spatial path model according to the feature points; S300: determine a position of a tunnel inner orifice according to the tunnel spatial path model; S400: position a hollow sleeve by a mechanical arm according to the position of the tunnel inner orifice, so as to align an inner cavity of the hollow sleeve with the tunnel inner orifice; and S500: establish a tunnel by means of a tool under guidance of the hollow sleeve.

According to the present disclosure, by means of an arthroscopy system, an inner structure of a joint is observed, and the whole process of surgery is accurately observed; by mean of a point collecting and modeling system, a position of a tunnel in the joint is positioned, and a tunnel spatial path model is established to simulate a tunnel path; and by means of a mechanical arm positioning system, the tunnel path is subjected to physical positioning, so as to guide the surgery to assist a surgeon in establishing a tibial tunnel and a femoral tunnel by means of a guide pin at one time. Therefore, disadvantages that extreme knee bending occurs, tunnel positioning is not accurate, a tunnel length is overshort, an outer orifice is overlow, a common peroneal nerve is likely to be damaged, and an iliotibial band is likely to be stimulated of establishment of a femoral tunnel by means of an anteromedial approach are avoided, surgery difficulty is reduced, and surgery quality and efficiency are improved.

As a preferred embodiment of the present disclosure, the arthroscopy system includes an arthroscope and a display device, and the display device is a display screen. The arthroscope includes a hollow rod, lenses, optical fibers and a photographing device are fixed in the hollow rod, the photographing device is connected to a display device, the hollow rod is connected to a power device, and an end of the hollow rod is guided into a joint by means of the power device.

The hollow rod is a thin rod having a length of more than 20 cm and a thickness ranging from 4 mm to 5 mm, which is used for being inserted into a joint cavity. A group of optical fibers and a group of lenses are contained in the rod, the optical fibers transmit light into a joint, and the lenses transmit out images in the joint. Outside the joint, the optical fibers are connected to a cold light source by means of an optical cable, such that the cold light source may illuminate the joint. The lenses are connected to a host and the display device 4 by means of a camera, so as to reflect images in the joint on the display device 4. The arthroscope is placed into the joint through a small incision about ranging from 0.8 mm to 1.0 cm in a skin, and the camera and a display apparatus are connected behind the arthroscope, such that morphology and lesions in the joint may be directly observed.

As a preferred embodiment of the present disclosure, the point collecting and modeling system includes a probe, a tracker and a computer, the probe is connected to the tracker, and the tracker is connected to the computer.

As a preferred embodiment of the present disclosure, the probe is used for collecting a plurality of sampling points under an arthroscope, the tracker transmits the sampling points to the computer, the plurality of sampling points form a sampling point set, and the computer establishes a three-dimensional coordinate system and a tunnel spatial path model according to the sampling point set, and determines positions of tibial and femoral tunnel inner orifices according to a predetermined algorithm.

As a preferred embodiment of the present disclosure, the mechanical arm positioning system includes a mechanical arm, and a hollow sleeve is arranged at an end of the mechanical arm. What can be added is that by means of the mechanical arm in the present disclosure, assisted positioning may be carried out to enable a drill bit and a guide pin to accurately drill into or be guided into a tunnel inner orifice for surgery; moreover, anesthesia may be carried out, a tourniquet is bound, positions (90-degree knee bending and placement of a baffle on a lateral surface of a proximal section of a thigh) are arranged, a body surface is marked, disinfection and draping are carried out, whether a diagnostic arthroscope is suitable for mechanical arm assisted anterior cruciate ligament reconstruction surgery is determined again, an autograft is cut and prepared, and other operations before surgery may be carried out.

As a preferred embodiment of the present disclosure, the mechanical arm is a seven-degree-of-freedom mechanical arm with high flexibility, and may rotate at a plurality of angles to align the hollow sleeve with the tunnel inner orifice.

As a preferred embodiment of the present disclosure, an inner diameter of the hollow sleeve is greater than an inner diameter of the tunnel, such that the drill bit and the guide pin may be inserted into the hollow sleeve and drill into the tunnel inner orifice for surgery.

In addition, according to the above intelligent control system for knee ligament reconstruction, the present disclosure further provides an intelligent control method for knee ligament reconstruction. an operation method includes:

carry out preparation before surgery, specifically, according to patient's medical history, specialized physical examination and magnetic resonance imaging (MRI) data, determine surgical indications and surgical methods, especially determine whether a patient is suitable for mechanical arm assisted anterior cruciate ligament reconstruction surgery.

Carry out operations before surgery, specifically, carry out anesthesia, bind a tourniquet, arrange positions (90-degree knee bending and placement of a baffle on a lateral surface of a proximal section of a thigh), mark a body surface, carry out disinfection and draping, determine whether a diagnostic arthroscope is suitable for mechanical arm assisted anterior cruciate ligament reconstruction surgery again, and cut and prepare an autograft.

S100: Collect several position points within a sight range of an arthroscope system to form a sampling point set, establish a three-dimensional coordinate system according to the sampling point set, and according to a calibration prompt of a point collecting and modeling system, select a medial meniscus most-medial point A, a lateral meniscus most-lateral point B, a medial malleolus body surface positioning point C and a lateral malleolus body surface positioning point D by means of a rigid probe under an arthroscope. An x-axis is determined by means of points A and B, and a z-axis (along a long axis of a calf) is determined by making a vertical line AB passing through a midpoint of CD, so as to establish a three-dimensional coordinate system.

S200: Select several feature points from the three-dimensional coordinate system, and establish a tunnel spatial path model according to the feature points; determine whether a surgical site is a left knee or a right knee on the system; select surgical methods, where in the case of anterior cruciate ligament single-bundle and double-bundle reconstruction surgery, there is no great difference in selection of feature points; and according to the different surgical methods selected, obtain corresponding tibial tunnel and femoral tunnel inner orifice positions being slightly different.

S300: Determine a position of the tunnel inner orifice according to the tunnel spatial path model; and simulate a positioning map, specifically, generate joint surface feature point and tunnel inner orifice position effect maps on a point collecting and modeling system interface; and generate anterior and lateral tunnel position effect maps, and determine that the several effect maps are basically consistent by a surgeon.

S400: Position a hollow sleeve by means of a mechanical arm according to the position of the tunnel inner orifice, so as to align an inner cavity of the hollow sleeve with the tunnel inner orifice.

S500: Establish a tunnel by means of a tool under guidance of the hollow sleeve.

As a preferred embodiment of the present disclosure, the step S200 includes:

S201: Firstly, carry out rough point collecting and modeling, specifically, carry out multi-point collecting on joint surfaces of the femur and the tibia by means of a rigid probe respectively; simulate joint surface effect maps by a computer through multi-point collecting; and then transmit the joint effect maps to a display device by the computer to be displayed.

In the process of rough point collecting and modeling, feature points may be collected by means of a rigid probe under an arthroscope, or rectification may be carried out by means of a model three-dimensionally reconstructed according preoperative imaging data.

S202: Then, carry out fine point collecting and modeling, specifically, carry out fine point collecting, collect an over-the-top point E, a lower reference point F, any point G on a lateral meniscus free edge and any point H on a medial intercondylar crest lateral slope surface, and determine a position of a tibial tunnel inner orifice and a position of a femoral tunnel inner orifice by a computer according to a predetermined algorithm and fine point collecting.

In the case of selection of the feature points, algorithms may be adjusted according to habits of different operators, some feature points (including but not limited to the above four points E, F, G and H) may be selected to determine the position of the tibial tunnel inner orifice and the position of the femoral tunnel inner orifice through the algorithms, or predetermined positions of the inner orifices may be directly calibrated according to experience of surgeon.

Methods for determining a position of a tibial tunnel inner orifice and a position of a femoral tunnel inner orifice are as follows: in the example, determine a tibial tunnel inner orifice by an intersection point of a line passing through G and parallel to the x-axis and a line passing through H and parallel to the y-axis (a projection onto a tibial joint surface); and determine a femoral tunnel inner orifice by moving 5 mm from point F and then moving towards point E by 5 mm (a projection onto a femoral joint surface).

As a preferred embodiment of the present disclosure, the step S500 includes:

S501: Align the hollow sleeve with the tibial tunnel inner orifice, insert a drill bit into the hollow sleeve to drill a tibial tunnel outer orifice recess, and insert a guide pin into the tibial tunnel outer orifice recess to establish a tibial tunnel;

S502: Align the hollow sleeve with the femoral tunnel inner orifice, insert a drill bit into the hollow sleeve to drill a femoral tunnel outer orifice recess, and insert a guide pin into the femoral tunnel outer orifice recess to establish a femoral tunnel.

A mechanical arm positioning step further includes: S600: after a tunnel direction is determined, make a mechanical arm in place according to a predetermined straight line. In this step, a surgeon is required to determine that a tunnel position is not shifted at any time. A specific implementation method is as follows: mark, by a surgeon by means of a rigid probe, a position of a tibial tunnel inner orifice and a position of a femoral tunnel inner orifice determined according to experience of the surgeon, and determine, through comparison, whether the positions are on the straight line determined by an axis of the hollow sleeve.

S601: If the surgeon is not satisfied with the above calibration result, abandon the above point taking method, and directly mark tibial and femoral tunnel inner orifices.

S602: If the surgeon is satisfied with the above calibration result, continue to carry out operations, that is, under the condition of knee fixation, drill a tibial tunnel outer orifice recess by a drill bit, and establish a tibial tunnel by a guide pin. After the tibial tunnel is established, whether the requirement that a tibial tunnel and a femoral tunnel are established at one time by one guide pin is satisfied is determined, and a femoral tunnel is established, so as to complete mechanical arm assisted surgical steps. In the case of accurate tibial tunnel establishment, after the drill bit drills a tunnel outer orifice recess, the guide pin may be drilled into the recess in a mechanical arm positioning direction or by means of existing surgical instruments including various positioners.

Similar to operations of conventional anterior cruciate ligament reconstruction surgery, later operations of the mechanical arm include: expand a tunnel by a drill bit, carry out intercondylar fovea plasty, graft and fix a graft, carry out biomechanical examination after grafting, carry out suture and binding up, carry out rehabilitation training, etc.

What are mentioned above are merely preferred embodiments of the present disclosure, the scope of protection of the present disclosure is not limited to the above examples, and all technical solutions following the idea of the present disclosure fall within the scope of protection of the present disclosure. It should be noted that several improvements and modifications made by those of ordinary skill in the art without departing from the principle of the present disclosure should fall within the scope of protection of the present disclosure.

Various technical features in the above examples can be arbitrarily combined. In order to simplify description, not all possible combinations of the various technical features in the above examples are described. However, if only combinations of these technical features do not conflict, they shall fall within the scope of description of the present disclosure.

What is claimed is:

1. A tunnel position determination system for anterior/posterior cruciate ligament reconstruction, comprising:
a point collecting and modeling device for determining a specific tunnel position of a reconstruction tunnel and specifically comprising:
a coordinate system establishment module for establishing two coordinate systems comprising a femoral coordinate system based on a femur and a tibial coordinate system based on a tibia;
a feature point selection module for selecting femoral feature points and tibial feature points by means of a probe under an arthroscope;
a tunnel position determination module for determining a femoral point and a tibial point during reconstruction according to a preset reconstruction algorithm on the basis of the femoral feature points and the tibial feature points, and further determining a specific tunnel position of a ligament reconstruction tunnel by means of the femoral point and the tibial point, wherein the coordinate system establishment module specifically comprises:
 a position tracking unit for fixing an optical femoral marker and an optical tibial marker on the femur and the tibia respectively, and tracking a position of the femur and a position of the tibia in real time by an optical tracker;
 a hip center fitting unit for obtaining a femoral position data set of the optical femoral marker under the optical tracker, and fitting the femoral position data set to compute a hip midpoint;
 a flexion-extension axis obtainment unit for obtaining a tibial position data set of the optical tibial marker under the optical tracker, fitting the tibial position data set to obtain a plane, taking a normal line of the plane as a flexion-extension axis of the tibia, and taking the flexion-extension axis as a femoral x-axis of the femoral coordinate system and a tibial x-axis of the tibial coordinate system;
 a coordinate axis determination unit for obtaining position information of a knee midpoint and an ankle midpoint, taking a connecting line between the knee midpoint and the hip midpoint as a femoral y-axis of the femoral coordinate system, establishing a femoral z-axis by means of a cross product of the femoral x-axis and the femoral y-axis, and taking the knee midpoint as an origin of the femoral coordinate system, such that the femoral coordinate system is established; and taking a connecting line between the knee midpoint and the ankle midpoint as a tibial y-axis of the tibial coordinate system, establishing a tibial z-axis by means of a cross product of the tibial x-axis and the tibial y-axis, and taking the knee midpoint as an origin of the tibial coordinate system, such that the tibial coordinate system is established.

2. The tunnel position determination system for anterior/posterior cruciate ligament reconstruction according to claim 1, further comprising:
 a mechanical arm positioning device for being connected to the point collecting and modeling device to carry out physically assisted positioning on the reconstruction tunnel according to the determined specific tunnel position of the reconstruction tunnel, so as to guide anterior/posterior cruciate ligament surgery.

3. A tunnel position determination system for anterior/posterior cruciate ligament reconstruction, comprising:
 a point collecting and modeling device for determining a specific tunnel position of a reconstruction tunnel and specifically comprising:
 a coordinate system establishment module for establishing two coordinate systems comprising a femoral coordinate system based on a femur and a tibial coordinate system based on a tibia;
 a feature point selection module for selecting femoral feature points and tibial feature points by means of a probe under an arthroscope;
 a tunnel position determination module for determining a femoral point and a tibial point during reconstruction according to a preset reconstruction algorithm on the basis of the femoral feature points and the tibial feature points, and further determining a specific tunnel position of a ligament reconstruction tunnel by means of the femoral point and the tibial point, wherein the tunnel position determination module is configured to establish the reconstruction tunnel through any one of an anterior/posterior cruciate ligament single-bundle reconstruction algorithm, an anterior cruciate ligament isometric reconstruction algorithm and an anterior/posterior cruciate ligament double-bundle reconstruction algorithm, and further comprising an anterior/posterior cruciate ligament single-bundle reconstruction sub-module, an anterior cruciate ligament isometric reconstruction sub-module and an anterior/posterior cruciate ligament double-bundle reconstruction sub-module that are used for executing the anterior/posterior cruciate ligament single-bundle reconstruction algorithm, the anterior cruciate ligament isometric reconstruction algorithm and the anterior/posterior cruciate ligament double-bundle reconstruction algorithm respectively.

4. The tunnel position determination system for anterior/posterior cruciate ligament reconstruction according to claim 3, wherein the anterior/posterior cruciate ligament single-bundle reconstruction sub-module specifically comprises:
 a single-bundle femoral point determination unit for determining the femoral point of the reconstruction tunnel on the basis of the femoral feature points, which specifically comprises: moving a preset distance in a positive direction of the z-axis of the femoral coordinate system by taking a lower reference point as a reference point, and moving a preset distance towards an over-the-top point to determine an anterior cruciate ligament single-bundle femoral point; or selecting a point spaced from a front reference point by a fixed distance and spaced from a distal cartilage edge by a fixed distance as the femoral point, and enabling a direction to satisfy a requirement that an anterolateral approach can reach a fixed point to determine a posterior cruciate ligament single-bundle femoral point;
 a single-bundle tibial point determination unit for determining the tibial point of the reconstruction tunnel on the basis of the tibial feature points, which specifically comprises: enabling a sagittal line passing through a medial intercondylar crest lateral slope surface to intersect a horizontal line passing through a lateral meniscus anterior horn free edge to determine an anterior cruciate ligament single-bundle tibial point; or moving a fixed distance in a positive direction of the z-axis of the tibial coordinate system by taking a joint capsule attachment point as a reference point to reach an outer side of a posterior concave center line at a proximal end of the tibia, and enabling a direction to form an angle of 45 degrees relative to a tibial longitudinal axis to determine a posterior cruciate ligament single-bundle tibial point.

5. The tunnel position determination system for anterior/posterior cruciate ligament reconstruction according to claim 3, wherein the anterior cruciate ligament isometric reconstruction sub-module specifically comprises:
 an isometric femoral point determination unit for determining the femoral point of the reconstruction tunnel on the basis of the femoral feature points, which specifically comprises: moving preset distances in a negative direction of the y-axis and in a positive direction of the z-axis of the femoral coordinate system by taking an over-the-top point as a reference;
 an isometric tibial point determination unit for determining the tibial point of the reconstruction tunnel on the basis of the tibial feature points, which specifically comprises: enabling a sagittal line passing through a medial intercondylar crest lateral slope surface to intersect a horizontal line passing through a tibial plateau posterior cruciate ligament (PCL) anterior edge by a preset distance in a positive direction of the z-axis of the tibial coordinate system.

6. The tunnel position determination system for anterior/posterior cruciate ligament reconstruction according to claim 3, wherein the anterior cruciate ligament double-bundle reconstruction sub-module specifically comprises: an anteromedial (AM) bundle reconstruction unit and a posterolateral (PL) bundle reconstruction unit;

the AM bundle reconstruction unit is used for reconstructing an AM bundle in two reconstruction tunnels and further comprises:

an AM bundle femoral point determination sub-unit for determining the femoral point of the reconstruction tunnel on the basis of the femoral feature points, which specifically comprises: selecting a midpoint of an over-the-top point and a lower reference point;

an AM bundle tibial point determination sub-unit for determining the tibial point of the reconstruction tunnel on the basis of the tibial feature points, which specifically comprises: enabling a sagittal line passing through a medial intercondylar crest lateral slope surface to intersect a horizontal line passing through a lateral meniscus anterior horn free edge and a transverse knee ligament midpoint;

the PL bundle reconstruction unit is used for reconstructing a PL bundle in the two reconstruction tunnels and further comprises:

a PL bundle femoral point determination sub-unit for determining the femoral point of the reconstruction tunnel on the basis of the femoral feature points, which specifically comprises: moving a preset distance in a positive direction of the z-axis of the femoral coordinate system by taking a lower reference point as a reference point;

a PL bundle tibial point determination sub-unit for determining the tibial point of the reconstruction tunnel on the basis of the tibial feature points, which specifically comprises: enabling a sagittal line passing through the medial intercondylar crest lateral slope surface to intersect a horizontal line passing through the lateral meniscus anterior horn free edge and a lateral intercondylar crest top point.

7. The tunnel position determination system for anterior/posterior cruciate ligament reconstruction according to claim 3, wherein the posterior cruciate ligament double-bundle reconstruction sub-module specifically comprises:

a double-bundle tibial point determination unit for determining the tibial point for tunnel reconstruction in the posterior cruciate ligament double-bundle reconstruction algorithm and further comprising:

a tibial point posteromedial (PM) bundle inner orifice determination sub-unit for determining a PM bundle inner orifice of the tibial point in the posterior cruciate ligament double-bundle reconstruction algorithm, which specifically comprises: moving a joint capsule attachment point towards a front side by a fixed distance in a positive direction of the z-axis of the tibial coordinate system to reach a tibial PCL footprint half-area medial midpoint;

a tibial point anterolateral (AL) bundle inner orifice determination sub-unit for determining an AL bundle inner orifice of the tibial point in the posterior cruciate ligament double-bundle reconstruction algorithm, which specifically comprises: moving a joint capsule attachment point towards a front side by a fixed distance in a positive direction of the z-axis of the tibial coordinate system to reach a tibial PCL footprint area lateral edge; wherein in the cases of the tibial point PM bundle inner orifice determination sub-unit and the tibial point AL bundle inner orifice determination sub-unit, the PM bundle inner orifice and the AL bundle inner orifice are required to be spaced from each other by a fixed distance, or the AL bundle is translated towards an outer side by a fixed distance from the PM bundle; and a direction allows the PM bundle to form an angle of 45 degrees relative to a tibial longitudinal axis, an outer orifice of the reconstruction tunnel is spaced from a tibial anterior crest by a fixed distance, and the AL bundle is parallel to the PM bundle;

a double-bundle femoral point determination unit for determining the femoral point for tunnel reconstruction in the posterior cruciate ligament double-bundle reconstruction algorithm and further comprising:

a femoral point AL bundle inner orifice determination sub-unit for determining an AL bundle inner orifice of the femoral point in the posterior cruciate ligament double-bundle reconstruction algorithm, which specifically comprises: selecting a point spaced from a front reference point by a fixed distance and spaced from a distal cartilage edge by a fixed distance as the femoral point, and enabling a direction to satisfy a requirement that an anterolateral approach can reach a fixed point;

a femoral point PM bundle inner orifice determination sub-unit for determining a PM bundle inner orifice of the femoral point in the posterior cruciate ligament double-bundle reconstruction algorithm, which is specifically spaced from the AL bundle by a fixed distance and spaced from the nearest cartilage edge by a fixed distance;

in the cases of the femoral point AL bundle inner orifice determination sub-unit and the femoral point PM bundle inner orifice determination sub-unit, a direction is required to satisfy a requirement that an anterolateral approach can reach a fixed point, and the AL bundle is parallel to the PM bundle.

8. The tunnel position determination system for anterior/posterior cruciate ligament reconstruction according to claim 1, further comprising:

an arthroscopy device for observing an inner structure of a joint to undergo surgery, and monitoring an anterior/posterior cruciate ligament reconstruction surgery process in real time, wherein the point collecting and modeling device is used for determining the specific tunnel position of the reconstruction tunnel according to the inner structure of the joint to undergo surgery.

9. A tunnel position determination method for anterior/posterior cruciate ligament reconstruction, comprising steps as follows:

S1: establishing two coordinate systems comprising a femoral coordinate system based on a femur and a tibial coordinate system based on a tibia;

S2: selecting femoral feature points and tibial feature points by means of a probe under an arthroscope;

S3: determining a femoral point and a tibial point during reconstruction according to a preset reconstruction algorithm on the basis of the femoral feature points and the tibial feature points, and further determining a specific tunnel position of an anterior/posterior cruciate ligament reconstruction tunnel by means of the femoral point and the tibial point, wherein the step S1 of establishing two coordinate systems comprising a femoral coordinate system based on a femur and a tibial coordinate system based on a tibia specifically comprises:

S11: fixing an optical femoral marker and an optical tibial marker on the femur and the tibia respectively, and tracking a position of the femur and a position of the tibia in real time by an optical tracker;

S12: obtaining a femoral position data set of the optical femoral marker under the optical tracker, and computing a hip midpoint by fitting the femoral position data set;

S13: obtaining a tibial position data set of the optical tibial marker under the optical tracker, fitting the tibial position data set to obtain a plane, taking a normal line of the plane as a flexion-extension axis of the tibia, and taking the flexion-extension axis as a femoral x-axis of the femoral coordinate system and a tibial x-axis of the tibial coordinate system;

S14: obtaining position information of a knee midpoint and an ankle midpoint, taking a connecting line between the knee midpoint and the hip midpoint as a femoral y-axis of the femoral coordinate system, establishing a femoral z-axis by means of a cross product of the femoral x-axis and the femoral y-axis, and taking the knee midpoint as an origin of the femoral coordinate system, such that the femoral coordinate system is established; and taking a connecting line between the knee midpoint and the ankle midpoint as a tibial y-axis of the tibial coordinate system, establishing a tibial z-axis by means of a cross product of the tibial x-axis and the tibial y-axis, and taking the knee midpoint as an origin of the tibial coordinate system, such that the tibial coordinate system is established.

10. The tunnel position determination method for anterior/posterior cruciate ligament reconstruction according to claim 9, wherein in the step S2, during anterior cruciate ligament reconstruction, the tibial feature points comprise a medial intercondylar crest lateral slope surface, a lateral meniscus anterior horn free edge, a transverse knee ligament midpoint, a lateral intercondylar crest top point, and a tibial plateau PCL anterior edge, and the femoral feature points comprise an over-the-top point and a lower reference point.

11. The tunnel position determination method for anterior/posterior cruciate ligament reconstruction according to claim 9, wherein in the step S2, during posterior cruciate ligament reconstruction, the femoral feature points comprise a front reference point and a distal cartilage edge, and the tibial feature points comprise a joint capsule attachment point, a tibial PCL footprint half-area medial midpoint, and a tibial PCL footprint area lateral edge.

12. A tunnel position determination method for anterior/posterior cruciate ligament reconstruction, comprising steps as follows:

S1: establishing two coordinate systems comprising a femoral coordinate system based on a femur and a tibial coordinate system based on a tibia;

S2: selecting femoral feature points and tibial feature points by means of a probe under an arthroscope;

S3: determining a femoral point and a tibial point during reconstruction according to a preset reconstruction algorithm on the basis of the femoral feature points and the tibial feature points, and further determining a specific tunnel position of an anterior/posterior cruciate ligament reconstruction tunnel by means of the femoral point and the tibial point, wherein in the step S3, the anterior/posterior cruciate ligament reconstruction tunnel is constructed through any one of an anterior/posterior cruciate ligament single-bundle reconstruction algorithm, an anterior cruciate ligament isometric reconstruction algorithm and an anterior/posterior cruciate ligament double-bundle reconstruction algorithm.

13. The tunnel position determination method for anterior/posterior cruciate ligament reconstruction according to claim 12, wherein the anterior cruciate ligament single-bundle reconstruction algorithm specifically comprises:

determining the femoral point of the reconstruction tunnel on the basis of the femoral feature points, which specifically comprises: moving a preset distance ranging from 4 mm to 5 mm in a positive direction of a z-axis of the femoral coordinate system by taking a lower reference point as a reference point, and moving a preset distance ranging from 4 mm to 5 mm towards an over-the-top point;

determining the tibial point of the reconstruction tunnel on the basis of the tibial feature points, which specifically comprises: enabling a sagittal line passing through a medial intercondylar crest lateral slope surface to intersect a horizontal line passing through a lateral meniscus anterior horn free edge.

14. The tunnel position determination method for anterior/posterior cruciate ligament reconstruction according to claim 12, wherein the anterior cruciate ligament isometric reconstruction algorithm specifically comprises:

determining the femoral point of the reconstruction tunnel on the basis of the femoral feature points, which specifically comprises: moving preset distances each ranging from 6 mm to 8 mm in a negative direction of a y-axis and a positive direction of a z-axis of the femoral coordinate system by taking an over-the-top point as a reference;

determining the tibial point of the reconstruction tunnel on the basis of the tibial feature points, which specifically comprises: enabling a sagittal line passing through a medial intercondylar crest lateral slope surface to intersect a horizontal line passing through a tibial plateau PCL anterior edge by a preset distance ranging from 6 mm to 8 mm in a positive direction of a z-axis of the tibial coordinate system.

15. The tunnel position determination method for anterior/posterior cruciate ligament reconstruction according to claim 12, wherein the anterior cruciate ligament double-bundle reconstruction algorithm comprises: reconstructing two reconstruction tunnels comprising an AM bundle and a PL bundle;

reconstructing the AM bundle specifically comprises:

determining an AM bundle femoral point of the reconstruction tunnel on the basis of the femoral feature points, which specifically comprises: selecting a midpoint of an over-the-top point and a lower reference point;

determining an AM bundle tibial point of the reconstruction tunnel on the basis of the tibial feature points, which specifically comprises: enabling a sagittal line passing through a medial intercondylar crest lateral slope surface to intersect a horizontal line passing through a lateral meniscus anterior horn free edge and a transverse knee ligament midpoint; and reconstructing the PL bundle specifically comprises:
determining a PL bundle femoral point of the reconstruction tunnel on the basis of the femoral feature points, which specifically comprises: moving a preset distance in a positive direction of a z-axis of the femoral coordinate system by taking a lower reference point as a reference point;
determining a PL bundle tibial point of the reconstruction tunnel on the basis of the tibial feature points, which specifically comprises: enabling a sagittal line passing through a medial intercondylar crest lateral slope surface to intersect a horizontal line passing through a lateral meniscus anterior horn free edge and a lateral intercondylar crest top point.

16. The tunnel position determination method for anterior/posterior cruciate ligament reconstruction according to claim 15, wherein the anterior cruciate ligament double-bundle reconstruction algorithm further comprises:
moving, when the PL bundle femoral point is determined, a preset distance specifically ranging from 4 mm to 5 mm in the positive direction of the z-axis of the femoral coordinate system by taking the lower reference point as the reference point.

17. A tunnel determination method applied before anterior/posterior cruciate ligament reconstruction according to claim 12, wherein the posterior cruciate ligament single-bundle reconstruction algorithm specifically comprises:
determining the tibial point of the reconstruction tunnel on the basis of the tibial feature points, which specifically comprises: moving a fixed distance in a positive direction of a z-axis of the tibial coordinate system by taking a joint capsule attachment point as a reference point to reach an outer side of a posterior concave center line at a proximal end of the tibia, and enabling a direction to form an angle of 45 degrees relative to a tibial longitudinal axis;
determining the femoral point of the reconstruction tunnel on the basis of the femoral feature points, which specifically comprises: selecting a point spaced from a front reference point by a fixed distance and spaced from a distal cartilage edge by a fixed distance as the femoral point, and enabling a direction to satisfy a requirement that an anterolateral approach can reach a fixed point;
the posterior cruciate ligament single-bundle reconstruction algorithm further comprises:
moving, when the tibial point of the reconstruction tunnel is determined, a fixed distance specifically ranging from 6 mm to 8 mm in the positive direction of the z-axis of the tibial coordinate system by taking the joint capsule attachment point as the reference point;
selecting, when the femoral point of the reconstruction tunnel is determined, a point spaced from the front reference point by a fixed distance ranging from 11 mm to 13 mm and spaced from a distal cartilage edge by a fixed distance ranging from 6 mm to 8 mm as the femoral point.

18. A tunnel determination method applied before anterior/posterior cruciate ligament reconstruction according to claim 12, wherein the posterior cruciate ligament double-bundle reconstruction algorithm comprises: reconstructing two reconstruction tunnels comprising a PM bundle and an AL bundle;
the tibial point specifically comprises:
a PM bundle inner orifice, wherein a joint capsule attachment point is moved towards a front side by a fixed distance in a positive direction of a z-axis of the tibial coordinate system to reach a tibial PCL footprint half-area medial midpoint;
an AL bundle inner orifice, wherein a joint capsule attachment point is moved towards a front side by a fixed distance in a positive direction of a z-axis of the tibial coordinate system to reach a tibial PCL footprint area lateral edge;
the PM bundle inner orifice and the AL bundle inner orifice are required to be spaced from each other by a fixed distance, or the AL bundle is translated towards an outer side by a fixed distance from the PM bundle;
a direction allows the PM bundle to form an angle of 45 degrees relative to a tibial longitudinal axis, an outer orifice of the reconstruction tunnel is spaced from a tibial anterior crest by a fixed distance, and the AL bundle is parallel to the PM bundle;
the femoral point specifically comprises:
an AL bundle inner orifice, wherein a point spaced from a front reference point by a fixed distance and spaced from a distal cartilage edge by a fixed distance is selected as the femoral point, and a direction is required to satisfy a requirement that an anterolateral approach can reach a fixed point;
a PM bundle inner orifice that is spaced from the AL bundle by a fixed distance and spaced from the nearest cartilage edge by a fixed distance; wherein
a direction is required to satisfy a requirement that an anterolateral approach can reach a fixed point, and the AL bundle is parallel to the PM bundle.

19. A tunnel determination method applied before anterior/posterior cruciate ligament reconstruction according to claim 18, wherein the posterior cruciate ligament double-bundle reconstruction algorithm further comprises:
enabling, when the PM bundle inner orifice of the tibial point is determined, the joint capsule attachment point to move towards the front side by a fixed distance ranging from 6 mm to 8 mm in the positive direction of the z-axis of the tibial coordinate system;
enabling, when the AL bundle inner orifice of the tibial point is determined, the joint capsule attachment point to move towards the front side by a fixed distance ranging from 6 mm to 8 mm in the positive direction of the z-axis of the tibial coordinate system;
enabling, when the tibial point is determined, the PM bundle inner orifice and the AL bundle inner orifice to be spaced from each other by a fixed distance greater than 10 mm, or translating the AL bundle towards the outer side by a fixed distance ranging from 9 mm to 11 mm from the PM bundle, enabling the direction to allow the PM bundle to form the angle of 45 degrees relative to the tibial longitudinal axis, enabling the outer orifice of the reconstruction tunnel to be spaced from the tibial anterior crest by a fixed distance ranging from 18 mm to 22 mm;
selecting, when the AL bundle inner orifice of the femoral point is determined, a point spaced from the front reference point by a fixed distance ranging from 11 mm to 13 mm and spaced from a distal cartilage edge by a fixed distance ranging from 6 mm to 8 mm as the femoral point;
being, when the PM bundle inner orifice of the femoral point is determined, spaced from the AL bundle by a fixed distance ranging from 6 mm to 7 mm and spaced from the nearest cartilage edge by a fixed distance ranging from 6 mm to 7 mm.

\* \* \* \* \*